US010704718B2

(12) United States Patent
Tajiri et al.

(10) Patent No.: US 10,704,718 B2
(45) Date of Patent: Jul. 7, 2020

(54) FLEXIBLE JOINTS ASSEMBLY WITH FLEXURE RODS

(71) Applicant: Unison Industries, LLC, Jacksonville, FL (US)

(72) Inventors: Gordon Tajiri, Allentown, PA (US); Michael Thomas Kenworthy, Gilbert, AZ (US); Dattu G V Jonnalagadda, Ponnur (IN); Jason Levi Burdette, Beavercreek, OH (US); Lonnie Ray Stewart, Jr., Carlisle, OH (US)

(73) Assignee: Unison Industries, LLC, Jacksonville, FL (US)

( * ) Notice: Subject to any disclaimer, the term of this patent is extended or adjusted under 35 U.S.C. 154(b) by 266 days.

(21) Appl. No.: 15/415,109

(22) Filed: Jan. 25, 2017

(65) Prior Publication Data

US 2018/0209570 A1    Jul. 26, 2018

(51) Int. Cl.
| | |
|---|---|
| *F16L 27/111* | (2006.01) |
| *F04D 27/00* | (2006.01) |
| *F04D 29/54* | (2006.01) |
| *F02C 9/18* | (2006.01) |
| *F01D 9/06* | (2006.01) |
| *F02C 6/08* | (2006.01) |
| *F02C 7/00* | (2006.01) |
| *F16L 51/02* | (2006.01) |

(52) U.S. Cl.
CPC .............. *F16L 27/111* (2013.01); *F01D 9/06* (2013.01); *F02C 6/08* (2013.01); *F02C 7/00* (2013.01); *F02C 9/18* (2013.01); *F04D 27/009* (2013.01); *F04D 29/545* (2013.01); *F16L 51/026* (2013.01); *F05D 2220/32* (2013.01)

(58) Field of Classification Search
CPC ....... F16L 27/107; F16L 27/11; F16L 27/108; F16L 27/12; F16L 27/125; F16L 27/1085
USPC ................................ 285/286, 184, 282, 223
See application file for complete search history.

(56) References Cited

U.S. PATENT DOCUMENTS

| | | | |
|---|---|---|---|
| 4,307,754 A | | 12/1981 | Muratsubaki |
| 4,791,963 A | | 12/1988 | Gronert et al. |
| 5,069,487 A | * | 12/1991 | Sheppard ............ F01N 13/1811 285/123.1 |

(Continued)

FOREIGN PATENT DOCUMENTS

| | | |
|---|---|---|
| CN | 202868184 U | 4/2013 |
| DE | 1 450 409 A1 | 5/1969 |

(Continued)

OTHER PUBLICATIONS

Extended European Search Report and Opinion issued in connection with corresponding EP Application No. 18152970.2 dated Jun. 8, 2018.

(Continued)

*Primary Examiner* — Aaron M Dunwoody
(74) *Attorney, Agent, or Firm* — McGarry Bair PC

(57) ABSTRACT

A flexible joint assembly for a joint between a first duct and a second duct for providing a flow of fluid, such as bleed air in an aviation implementation. The flexible joint includes a bellows supported by a mounting assembly having a first support and a second support, provided within the interior of the bellows. A rod assembly can operably couple the first support and the second support.

13 Claims, 14 Drawing Sheets

(56) References Cited

U.S. PATENT DOCUMENTS

| | | |
|---|---|---|
| 5,286,071 A | 2/1994 | Storage |
| 5,370,427 A | 12/1994 | Hoelle et al. |
| 5,407,237 A | 4/1995 | Smolowitz |
| 5,520,222 A | 5/1996 | Chikama |
| 5,584,511 A | 12/1996 | Gonzalez et al. |
| 5,611,577 A | 3/1997 | Meyer et al. |
| 5,806,899 A | 9/1998 | Norikawa et al. |
| 6,860,519 B2 | 3/2005 | Berengut et al. |
| 7,677,606 B2 | 3/2010 | Rohwedder |
| 2004/0032123 A1* | 2/2004 | Chu ............ F16L 27/04 285/223 |
| 2004/0135449 A1* | 7/2004 | Beyer ............ F04D 29/666 310/90.5 |
| 2009/0103973 A1* | 4/2009 | Rohwedder ............ F16L 27/02 403/51 |
| 2010/0244439 A1 | 9/2010 | Take |
| 2013/0341911 A1* | 12/2013 | Jaffari ............ F16L 27/026 285/184 |

FOREIGN PATENT DOCUMENTS

| | | |
|---|---|---|
| JP | S5896186 A | 6/1983 |
| JP | S6063323 A | 4/1985 |
| JP | 3028686 B2 | 4/2000 |
| JP | 2001508160 | 6/2001 |
| JP | 2007009698 A | 1/2007 |
| WO | 2017007529 A1 | 1/2017 |

OTHER PUBLICATIONS

Office Action issued in connection with corresponding CA Application No. 2991611 dated Oct. 22, 2018.

Japanese Office Action for Counterpart JP2018-003028, dated May 14, 2019.

* cited by examiner

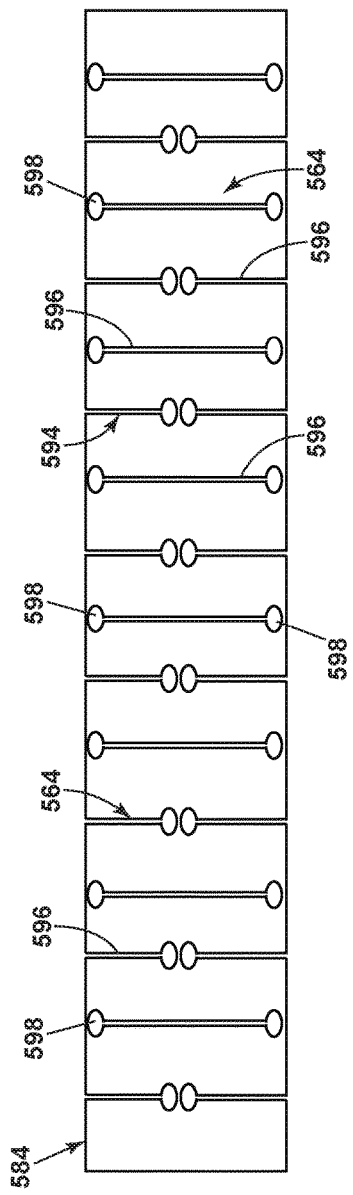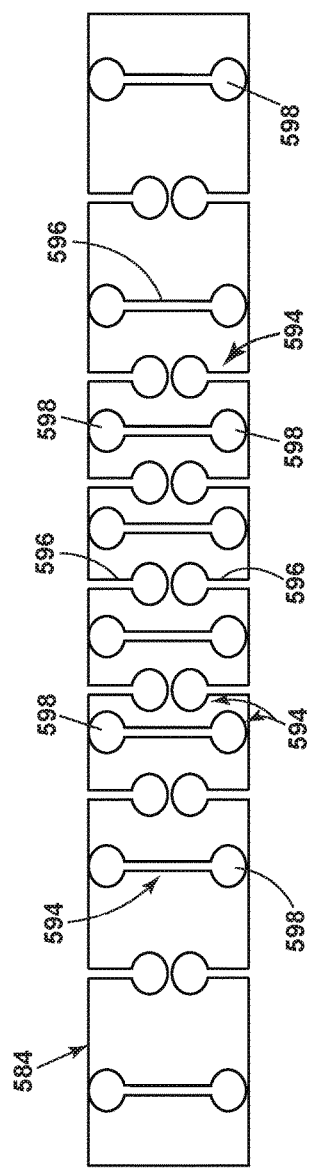
FIG. 12A
FIG. 12B

US 10,704,718 B2

FLEXIBLE JOINTS ASSEMBLY WITH FLEXURE RODS

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine stages, also including multiple pairs of rotating blades and stationary vanes.

Duct assemblies are provided about the turbine engine and provide conduits for the flow of various operating fluids to and from the turbine engine. One of the operating fluids is bleed air. In the compressor stages, bleed air is produced and taken from the compressor via feeder ducts. Bleed air from the compressor stages in the gas turbine engine can be utilized in various ways. For example, bleed air can provide pressure for the aircraft cabin, keep critical parts of the aircraft ice-free, or can be used to start remaining engines. Configuration of the feeder duct assembly used to take bleed air from the compressor requires rigidity under dynamic loading, and flexibility under thermal loading. Current systems use ball-joints or axial joints in the duct to meet requirements for flexibility, which compromise system dynamic performance and increase the weight of the system.

BRIEF DESCRIPTION OF THE INVENTION

In one aspect, the present disclosure relates to a duct assembly including a first duct, a second duct, and a flexible joint assembly coupling the first duct to the second duct. The flexible joint assembly includes a bellows defining an interior and having a first end and a second end where the first end and second end are operably coupled with the first duct and the second duct. The flexible joint assembly further incudes a support assembly located within the interior defined by the bellows and having a first support located within the first end and a second support, spaced form the first support and located within the second end. Further still, the flexible joint assembly includes a set of rod assemblies located within the interior and operably coupled to the first support and the second support, and spans a length there between. The set of rod assemblies are configured to act as rotational flexures to allow three rotational degrees of freedom at the flexible joint assembly.

In another aspect, the present disclosure relates to a joint assembly including a bellows defining an interior and fluidly coupling a first duct to a second duct and having a first end and a second end. A support assembly located within the interior has a first ring support located within the first end and a second ring support, spaced from the first support and located within the second end. A rod assembly includes a first end an a second end where the rod assembly is located within the interior and operably coupled at the first end to the first ring support and at the second end to the second ring support. The rod assembly spans the length between the first ring support and the second ring support and is configured to act as a rotational flexure.

In yet another aspect, the present disclosure relates to a joint assembly including a bellows defining an interior and fluidly couples a first duct to a second duct and where the bellows includes a first end and a second end and convolutions located there between. A support assembly is located within the interior defined by the bellows and includes a first support located within the first end and a second support, spaced from the first support and located within the second end. A rod assembly is located within the interior and operably couples to the first support and the second support and spans a length there between. The length of the rod assembly is sized to correspond to the convolutions of the bellows being in a compressed state such that the bellows is pre-loaded.

BRIEF DESCRIPTION OF THE DRAWINGS

In the drawings:

FIG. 12A is a view of an alternative sheath for the sheath of FIG. 11 in a flattened position illustrating a consistent spacing of the cutout pattern, in accordance with various aspects described herein.

FIG. 12B is a view of another alternative sheath for the sheath of FIG. 11 in a flattened position illustrating a variable spacing for the cutout pattern, in accordance with various aspects described herein.

DESCRIPTION OF EMBODIMENTS OF THE INVENTION

Figure 1:
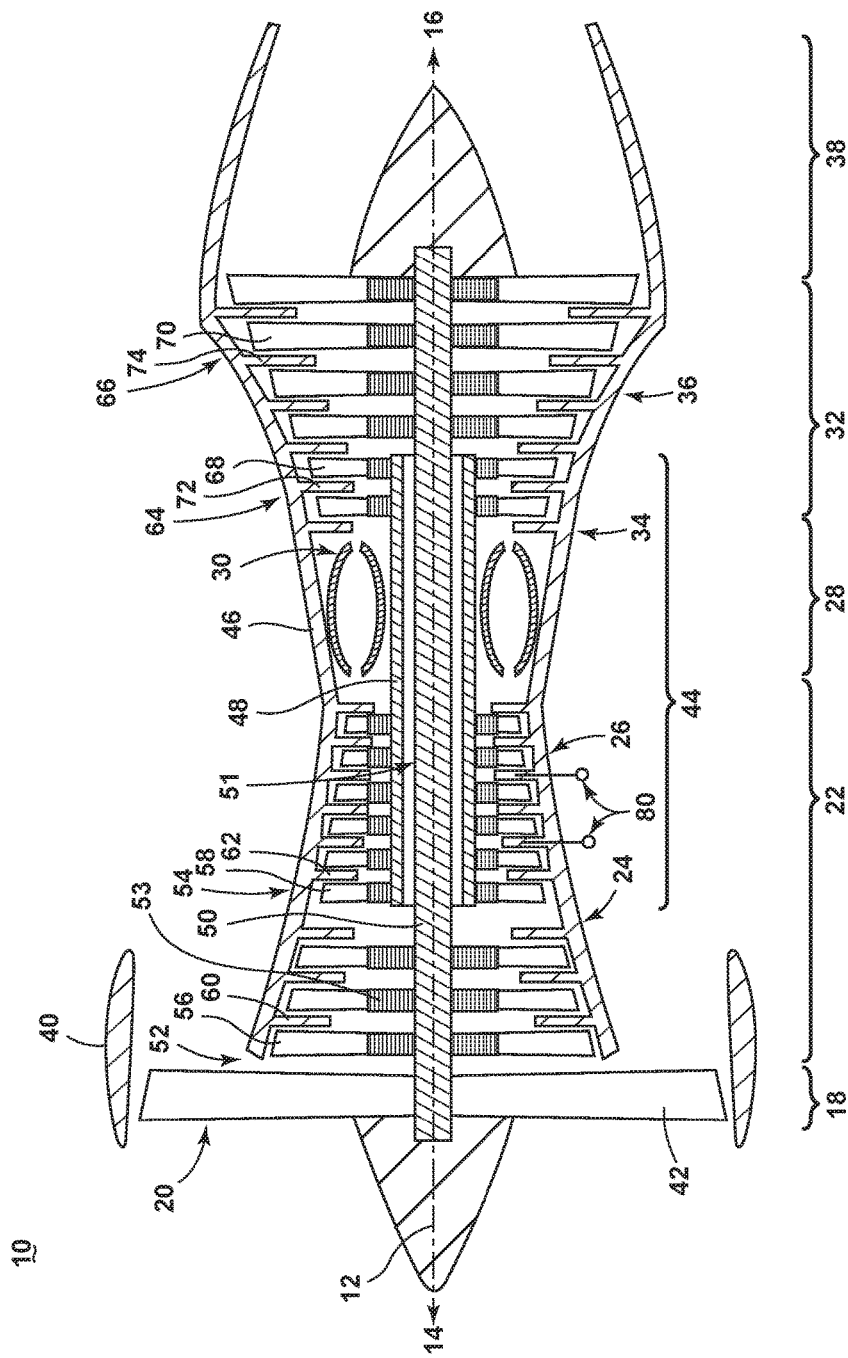
FIG. 1 is a schematic cross-sectional view of a gas turbine engine with a bleed air ducting assembly in accordance with various aspects described herein.

The described embodiments of the present invention are directed to providing a tunable, variable-section flexure for frictionless, wear-free flexible joint assemblies for improved rotational compliance for reduced reaction loading into the fan case of turbine engines during assembly and thermal growth of high temperature bleed-air ducting systems. For purposes of illustration, the present invention will be described with respect to an aircraft gas turbine engine. Gas turbine engines have been used for land and nautical locomotion and power generation, but are most commonly used for aeronautical applications such as for airplanes, including helicopters. In airplanes, gas turbine engines are used for propulsion of the aircraft. It will be understood, however, that the invention is not so limited and can have general applicability in non-aircraft applications, such as other mobile applications and non-mobile industrial, commercial, and residential applications. Additionally, the described embodiments will have equal applicability to any ducting system experiencing high system loading or large thrust and shear loads requiring a flexible joint assemblies to connect elements.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline. Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

A set as described herein should be understood to include one or more of a particular element. As such, a set can include just one of the particular element or any number of the particular element.

FIG. 1 is a schematic cross-sectional diagram of a gas turbine engine 10 for an aircraft. The engine 10 has a generally longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a set of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a set of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, respectively, with stages having their own disks. The vanes 60, 62 are mounted to the core casing 46 in a circumferential arrangement about the rotor 51.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the air from the compressor section 22 can be bled off via one or more bleed air duct assemblies 80, and be used for cooling of portions, especially hot portions, such as the HP turbine 34, or used to generate power or run environmental systems of the aircraft such as the cabin cooling/heating system or the deicing system. In the context of a turbine engine, the hot portions of the engine are normally downstream of the combustor 30, especially the turbine section 32, with the HP turbine 34 being the hottest portion as it is directly downstream of the combustion section 28. Air that is drawn off the compressor and used for these purposes is known as bleed air.

Figure 2:
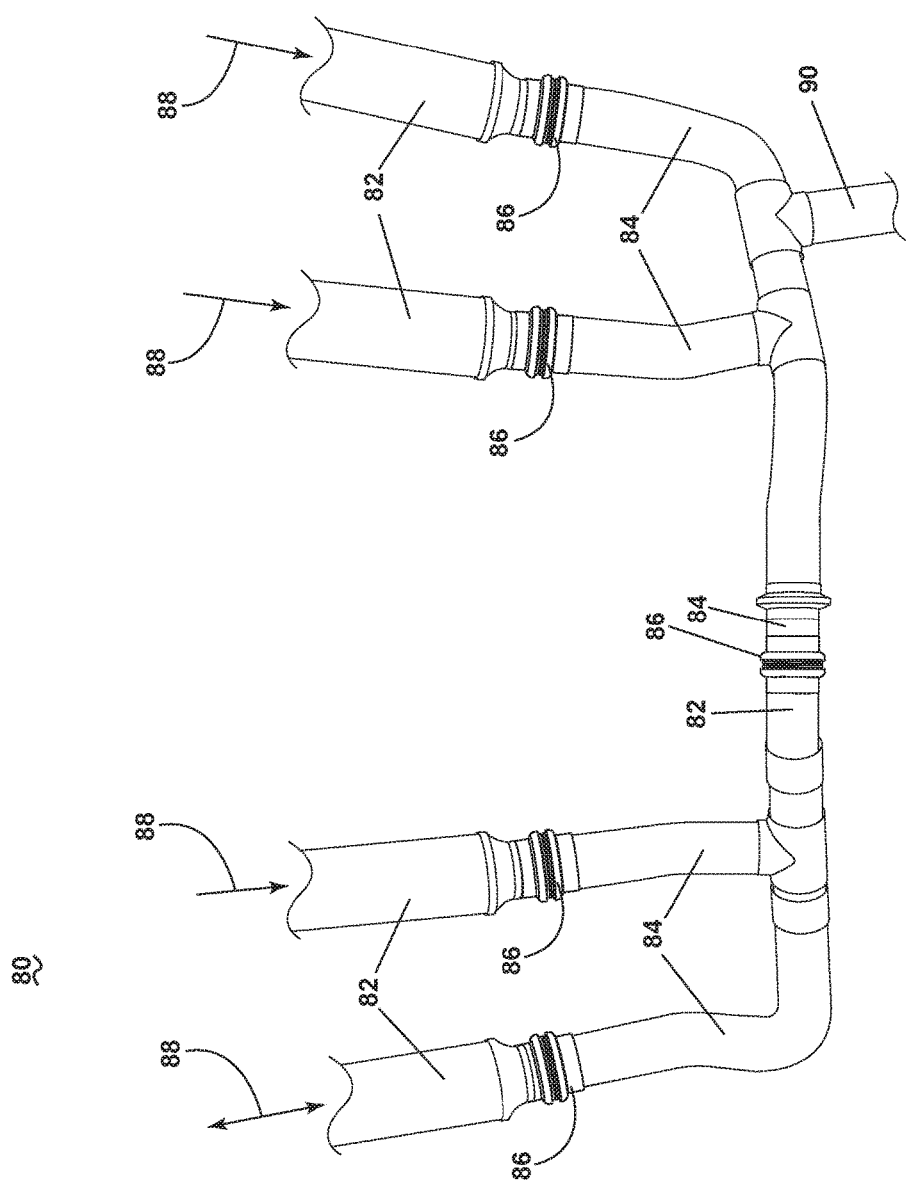
FIG. 2 is a perspective view of the bleed air ducting assembly having multiple flexible joints in accordance with various aspects described herein.

Referring to FIG. 2, an exemplary bleed air duct assembly 80 includes radially inner first ducts 82 and radially outer second ducts 84. The first and second ducts 82, 84 can be fixed in their position. It should be understood that the first ducts 82, being disposed radially inside of the outer ducts 84 is exemplary, and that the first and second ducts 82, 84 can have any position or orientation relative to one another. A joint assembly 86 couples the first and second ducts 82, 84. A flow of bleed air 88 can be drawn from the compressor section 22 (FIG. 1), for example, into the first ducts 82, through the second ducts 84, and provided to an exhaust duct 90 for use in various other portions of the engine 10 or aircraft. The flow of bleed air 88 can thermally heat and expand portions of the bleed air duct assembly 80. Alternatively, ambient or system temperatures around the bleed air duct assembly 80 can cause expansion and contraction ducts 82, 84, imparting axial loading along the ducts 82, 84. Such loading can cause bending or shearing forces at the ducts 82, 84 or the joints assemblies 86. The joint assemblies 86 provide for reducing or mitigating loading forces or any force acting on the bleed air duct assembly 80, while providing for operational flexion of the bleed air duct assembly 80. For example, the flexible joint assemblies 86 provides for transfer, kinematic movement, and bending movement of the duct assembly 80 under large thrust and shear loads at the interface between the first and second ducts 82, 84.

Figure 3:
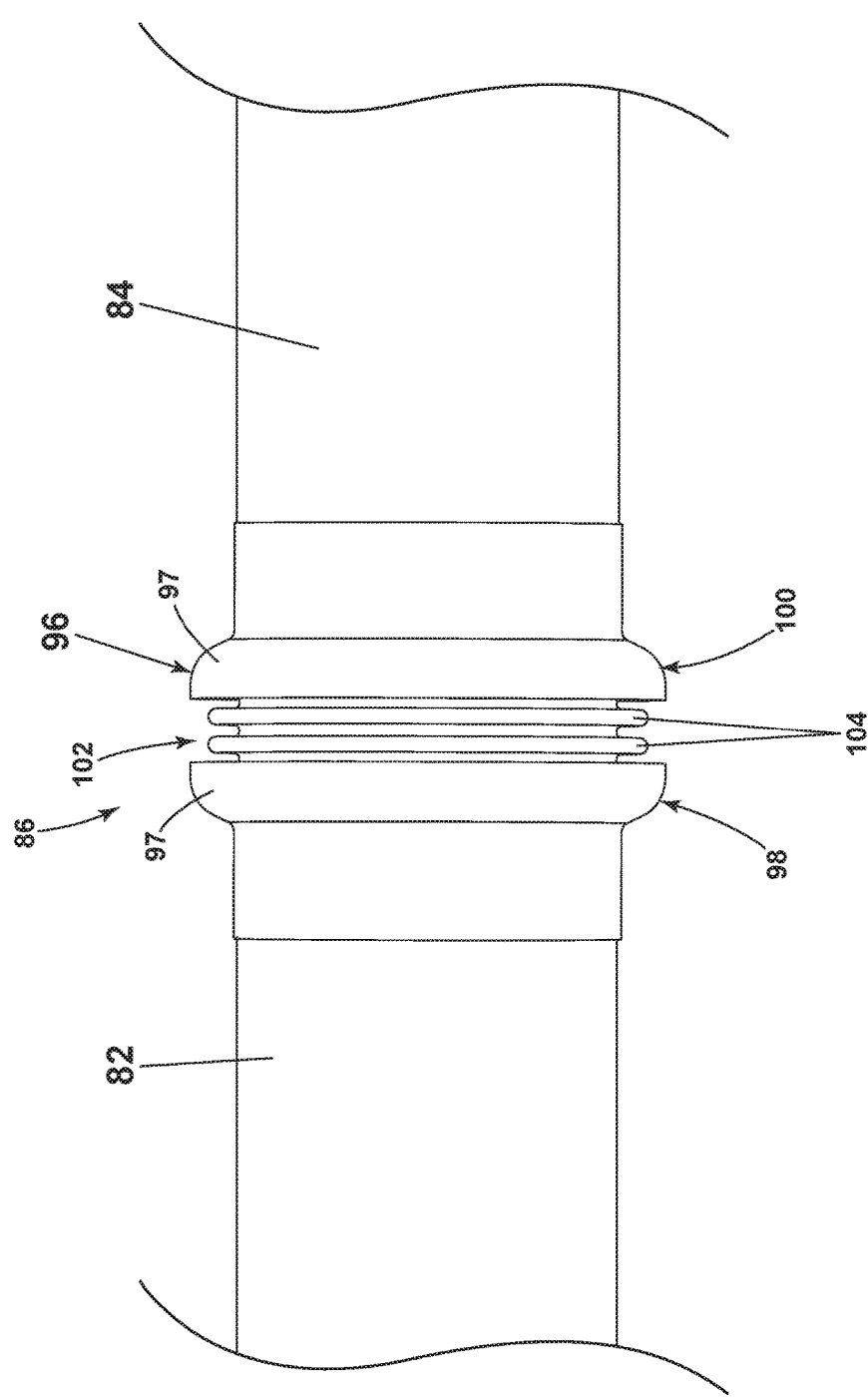
FIG. 3 is an enlarged view of one flexible joint of FIG. 2 coupling a first duct to a second duct in accordance with various aspects described herein.

FIG. 3 illustrates an exemplary joint assembly 86 that can be utilized in coupling the first duct 82 to the second duct 84. The joint assembly 86 includes a casing assembly 96 having a first casing 98 and a second casing 100. Each casing 98, 100 can include an arcuate end 97. A bellows 102 couples between the first and second casings 98, 100, fluidly coupling the first duct 82 to the second duct 84. The bellows 102 includes a plurality of convolutions 104. The bellows 102 can be coupled under a compressive pre-load, such that the bellows 102 provides an expansive force towards the opposing ducts 82, 84. The pre-load is constrained based upon the length of the bellows 102. Such a length can determine the compressive displacement of the bellows 102.

Figure 4:
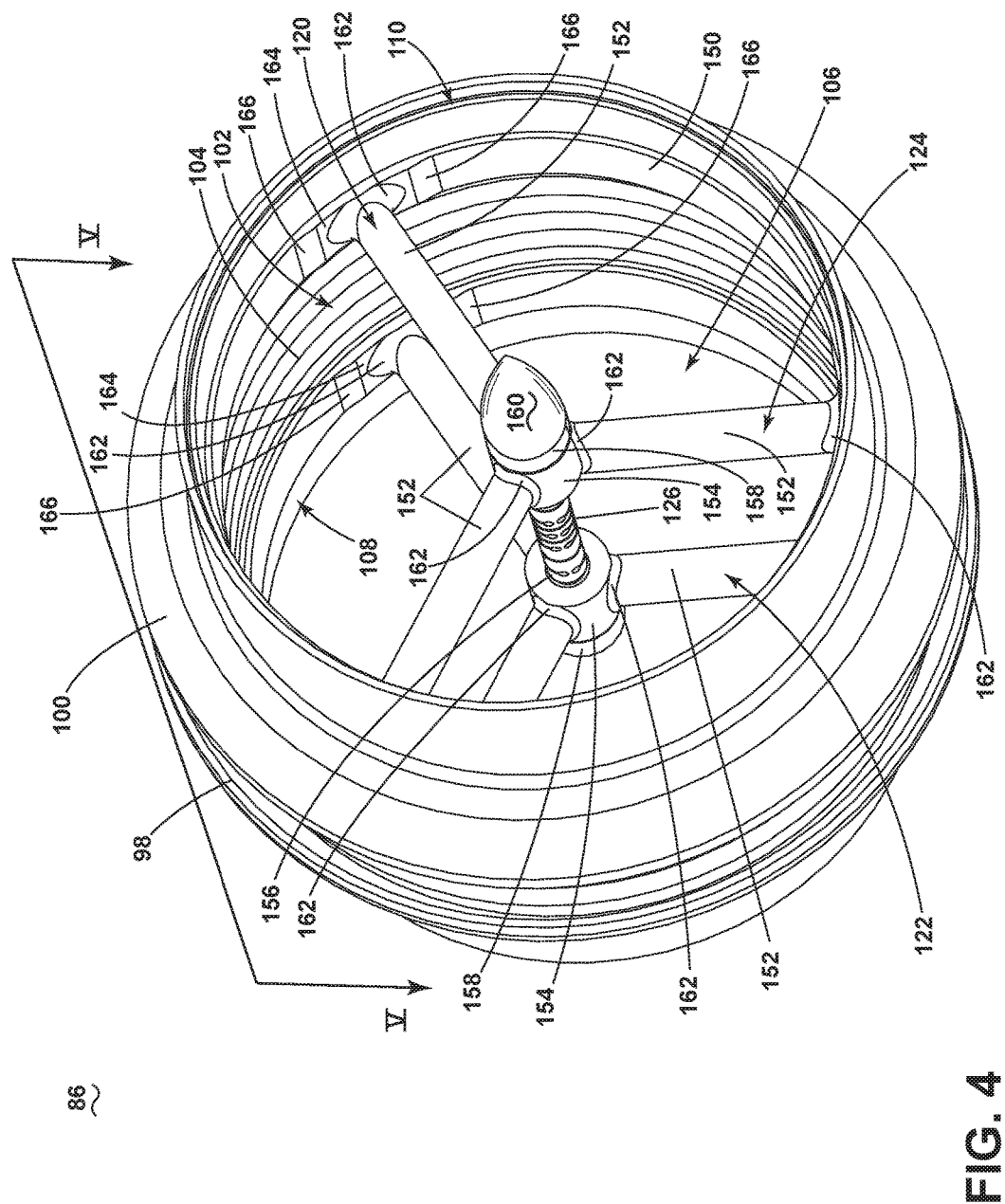
FIG. 4 is a perspective view of the flexible joint of FIG. 3 with the ducts removed in accordance with various aspects described herein.

Referring now to FIG. 4, the bellows 102 defines an interior 106 for the joint assembly 86. The bellows 102 can include a first end 108 and a second end 110. In one non-limiting example, the first end 108 can be adjacent the first duct 82 and the second end 110 can be adjacent the second duct 84. A support assembly 120 is located within the interior 108. The support assembly 120 includes a first support 122 and a second support 124. The first support 122 is located at the first end 108 and the second support 124 is located at the second end 110. The first support 122 can be spaced from and coupled to the second support 124 via a rod assembly 126. While only shown as one rod assembly 126, it should be appreciated that more than one rod assembly 126 is contemplated.

The support assembly 120 at each support 122, 124 includes a set of spokes 152 are included within an outer ring 150. While three spokes 152 are shown, any number of spokes 152 are contemplated. Three spokes 152 minimize weight at the joint assembly 86 while maximizing structural integrity per weight. The spokes 152 can be formed in any manner providing the necessary structural integrity to the support assembly 120 while minimizing weight.

The spokes 152 couple the outer ring 150 to a central section 154. The central section 154 can be a substantially cylindrical shape, adapted to uniformly joint any number of spokes 152 within the joint assembly 86. The central section 154 includes a central aperture 156. The spokes 152 couple to the central section 154 and the outer ring 150 at a filleted surface 162. The filleted surfaces 162 can maximize stiffness and bending moment at the joints between the spokes 152, which can directly transfer axial thrust loads to the rod assembly 126 from the casings 98, 100. The filleted surfaces 162 can also reduce drag at the joint between the spokes 152, the outer ring 150, and the central sections 154. Additionally, the outer ring 150 can include a thickened portion 164, providing for further improved structural integrity at the joint between the spokes 152 and the outer ring 150. The thickened portion 164 can include sloped transition 166 to the outer ring 150. The filleted surfaces 162 and thickened portions 164 provide for higher bending moments at the interconnections of the support assembly. The increased structural integrity of the support assembly 120 improves translation of axial and sheer forces to the rod assembly 126 connecting the first and second supports 122, 124.

The rod assembly 126 extends between the central sections 154 of the first and second supports 122, 124 to couple the first and second supports 122, 124. The rod assembly 126 extends through apertures 156 in the central sections 154. Bushings 158 are provided on the outside ends of the central sections 154 for securing the rod assembly 126 to the central sections 154. A cover 160 can be provided on the end of the bushings 158. The rod assembly 126 can extend through the bushings 158, the cover 160 can encase the ends of the rod assembly 126 at the bushings 158. The cover 160 is shown having a bullet-nose shape to minimize drag, while any shape of the cover 160 is contemplated, such as a hemispherical shape in one non-limiting example. In yet another non-limiting example, the cover 160 can be on one end of the support assembly 120, confronting an airflow passing through the joint assembly 86.

Figure 5:
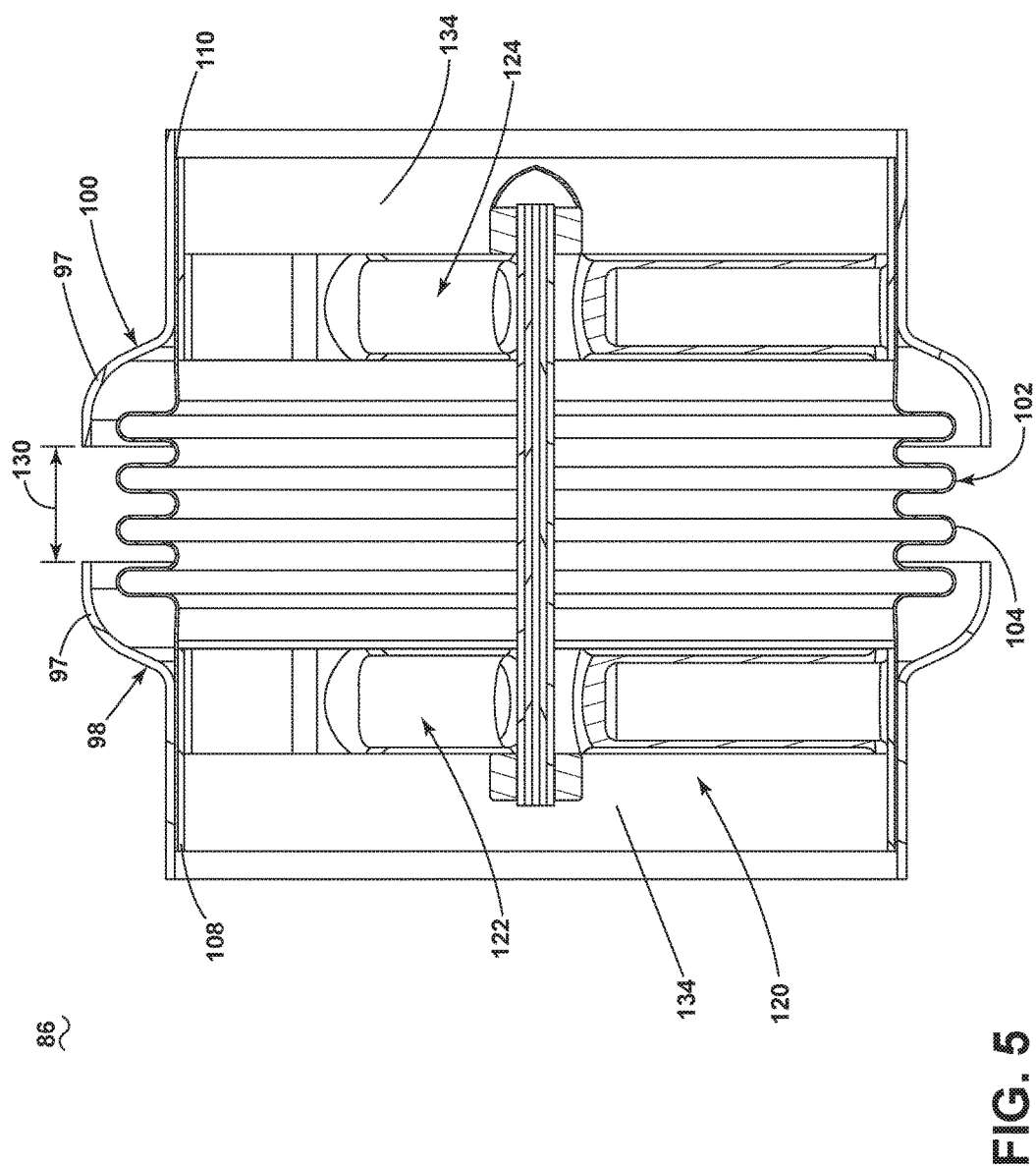
FIG. 5 is a cross-sectional view of the flexible joint of FIG. 4 taken across section V-V in accordance with various aspects described herein.

FIG. 5 illustrates a cross-sectional view of the joint assembly 86 taken across section V-V of FIG. 4. The first and second casings 98, 100 surround at least a portion the bellows 102 on the opposing ends 108, 110 of the bellows, respectively. The arcuate ends 97 of the casings 98, 100 can at least partially surround the convolutions 104. The bellows 102 can protect the interior of the joint assembly 86 as well as the support assembly 120. The arcuate ends 97 can be sized to surround the greatest potential diameter for the bellows 102 in a compressed position and can provide protection for the bellows 102 from the exterior of the joint assembly 86.

The first and second casings 98, 100 can be spaced by a first distance 130. As such, a portion of the bellows 102 is exposed to the exterior of the joint assembly 86. The distance 130 between the first and second casings 98, 100 permits flexion, expansion, and contraction of the bellows 102, as well as the joint assembly 86. The first distance 130 can be varied to tailor the particular pre-load of the bellows 102. The bellows first end 108 of the bellows 102 can couple to the first casing 98 and the second end 110 of the bellows 102 can couple to the second casing 100. The bellows 102 can be a single layer, or can be multi-layered.

A liner 134 can be provided on the interior of the bellows 102 at the first and second casings 98, 100. There can be two separate liners 134, one disposed at each end 108, 110 of the bellows 102. The liners 134 can extend partially along the casings 98, 100, extending partially under the arcuate portions 97.

The support assembly 120 can also mount or otherwise be operably coupled to the liners 134. In the illustrated example, the first support 122 mounts at the first end 108 of the bellows 102 and the first casing 98 and the second support 124 mounts at the second end 110 of the bellows 102 and the second casing 100. The first and second supports 122, 124 can be at least partially disposed radially within the arcuate portion 97. While the liners 134 and the supports 122, 124 are illustrated as extending partially within the arcuate portions 97 of the casings 98, 100, it is contemplated that such elements need not be positioned radially within the arcuate portions 97.

A penetration laser weld, in one non-limiting example can be used to couple elements of the joint assembly 86 including the casings 98, 100, bellows 102, the liners 134, or the supports 122, 124. The joint assembly 86 can couple to the adjacent first or second ducts 82, 84, for example, with a butt weld, while other attachments or couplings are contemplated. One such alternate attachment would include the joint assembly 86 having a diameter greater than the first or second ducts 82, 84 and at least partially overlapping a portion of the first and second ducts 82, 84, with the joint assembly welding around the first and second ducts 82, 84.

Figure 6:
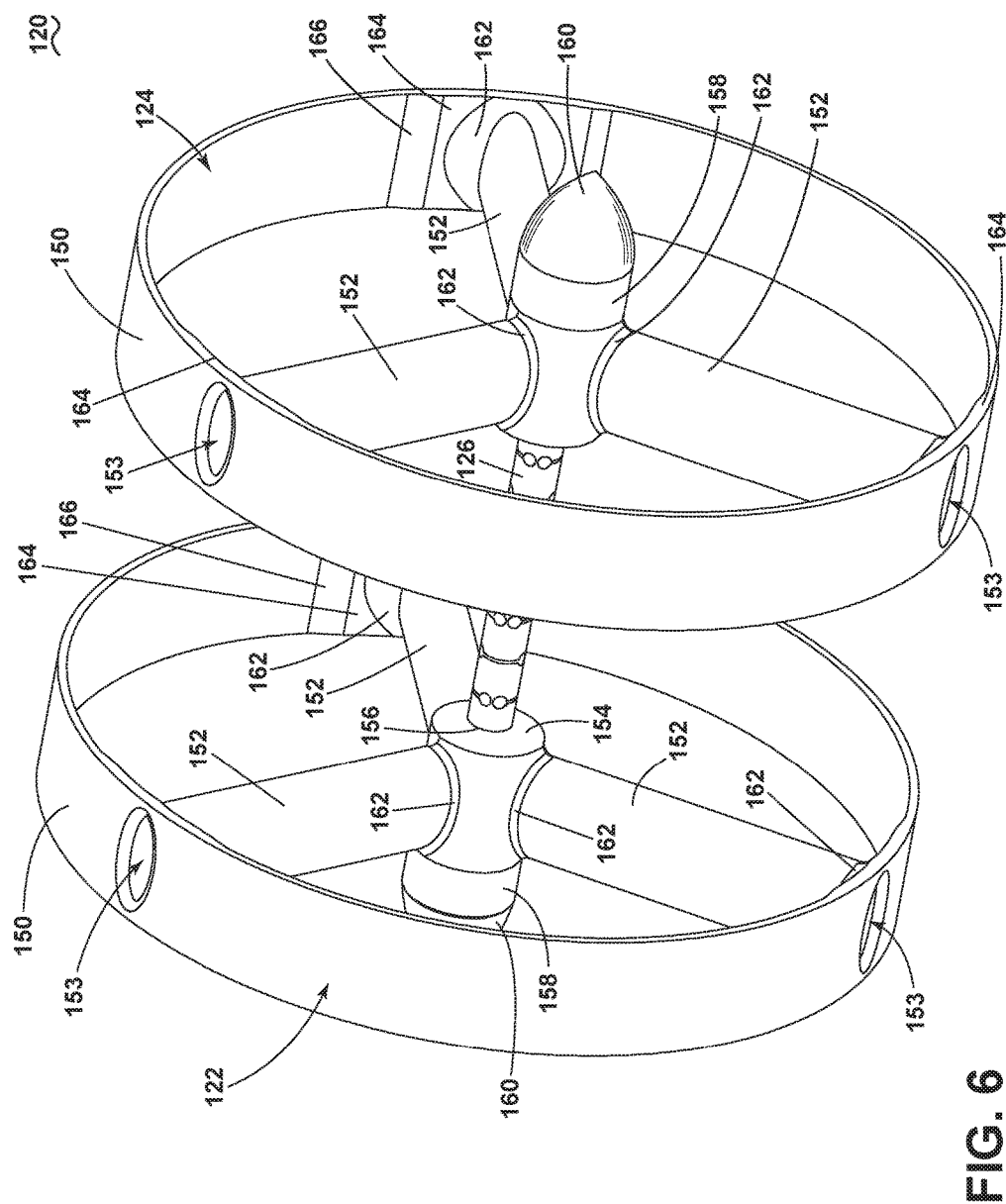
FIG. 6 is an exploded view of the flexible joint of FIG. 4 in accordance with various aspects described herein.

FIG. 6 better illustrates a perspective view of the support assembly 120. The spokes 152 can be hollow and define an interior 153. The hollow spokes 152 can minimize weight while maximizing structural integrity of the spokes 152. In an alternate non-limiting example, the spokes 152 can have a series of interior ribs to increase structural integrity, while adding weight. As such, it should be appreciated that a balance between structural support of the spokes and weight can be tailored to the particular needs of the support assembly 120.

Figure 7:
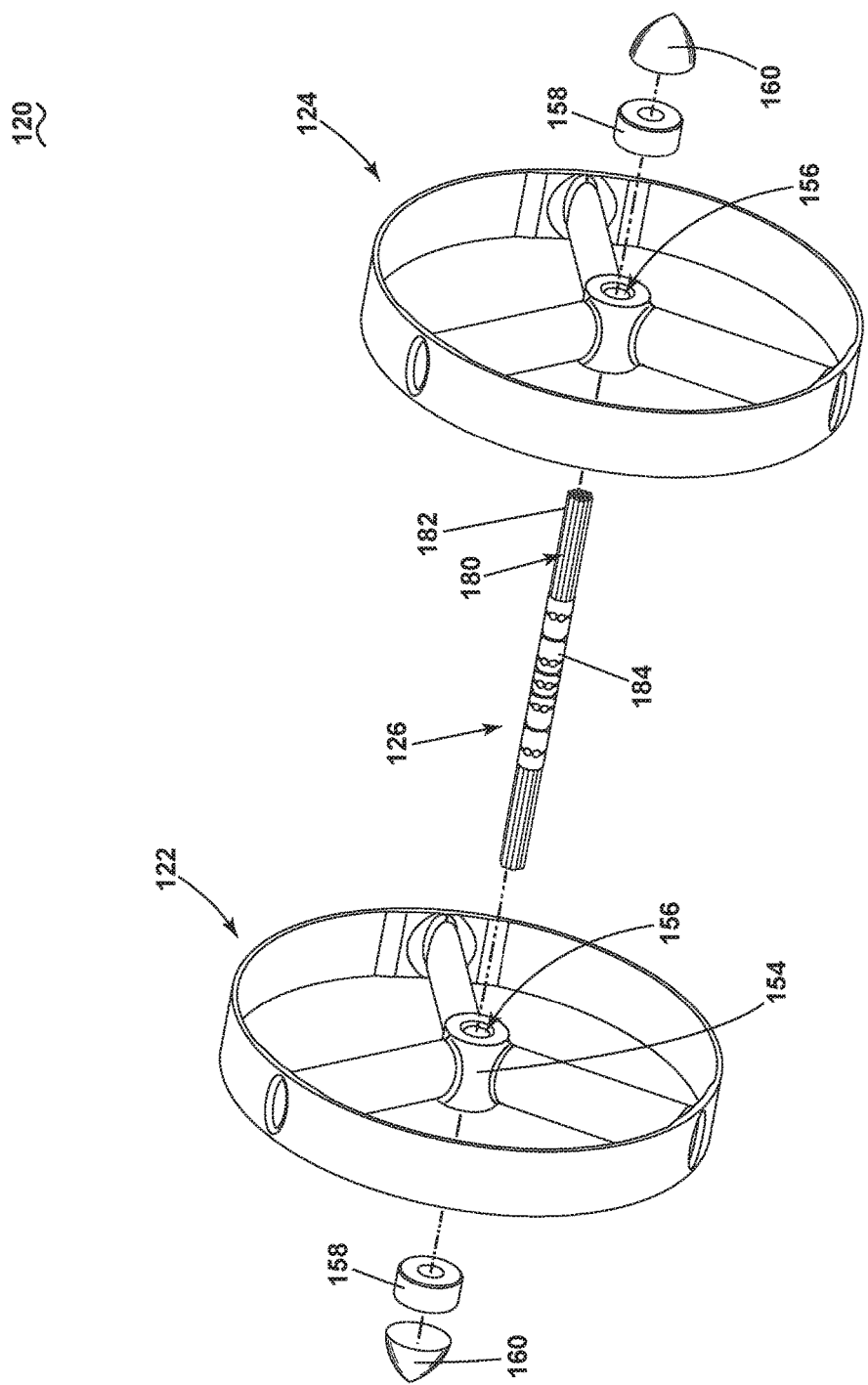
FIG. 7 is an exploded view of the support assembly of FIG. 6 in accordance with various aspects described herein.

FIG. 7 illustrates an exploded view of the support assembly 120. The rod assembly 126 which can be any rod assembly as described herein. During assembly, a rod bundle 180, which can be any organization of individual rods as described herein, such as that of FIGS. 8A and 8B, can extend through the aperture 156 in the central sections 154 of the first and second supports 122, 124. The bushings 158 can mount to the ends of the rod bundle 180 retaining the rod bundle 180 within the first and second supports 122, 124. The covers 160 can surround or otherwise be operably coupled to the ends of the bushings 158 to hide the mounted rod bundle 180.

The rods of the rod bundle 180 can be made of high temperature, spring-tempered alloy. The rods assembly 126 acts as rotational flexures at the joint assembly 86 to permit three rotational degrees of freedom. The rod assembly 126 can be adapted to dampen high thrust loads, having a high bending moment for the joint assembly 86. The use of the rod assembly 126 between the two supports 122, 124 decouples the high internal thrust pressure loads from the frictional interface, reaction shear loads. Traditional designs utilize a 'ball' joint with a spherical face contacting an outer shroud, which can experience a large amount of friction as internal pressure increases. The rod assembly 126 decouples the shrouds, to remove the frictional forces of the spherical face of the traditional 'ball' joint. Any axial loading on the joint assembly 86 is carried by the internal rod assembly 126 in the axial direction relative to the local bleed air duct assembly 80 (FIG. 2). In addition, the rod assembly 126 permits three degrees of rotational freedom for small angular rotations of the joint assembly 86. This can include, but is not limited to, less than eight-degrees in any given combined rotational direction. Additionally, using multiple rod assemblies 126 is contemplated, which can provide for distribution of axial loading and the bending moment loads equally among the rod assemblies 126 in an evenly-spaced rod assembly arrangement. One such arrangement could include positioning and mounting the rod bundles 180 along the spokes 152 as opposed to at the central section. One rod bundle 180 per spoke 152 would permit the use of three rod assemblies 126. As such, the number of rod assemblies 126 used or the particular arrangement of the rod assemblies 126 and spokes 152 can be organized based upon anticipated axial loads or bending moment loads. Use of the rod assembly 126 in the joint assembly 86 results in a lightweight, compact, and simplified zero-backlash design for rotational kinematic motion, about three degrees of freedom, without interfacial wear, friction, and associated high rotational stiffness.

Figure 8A:
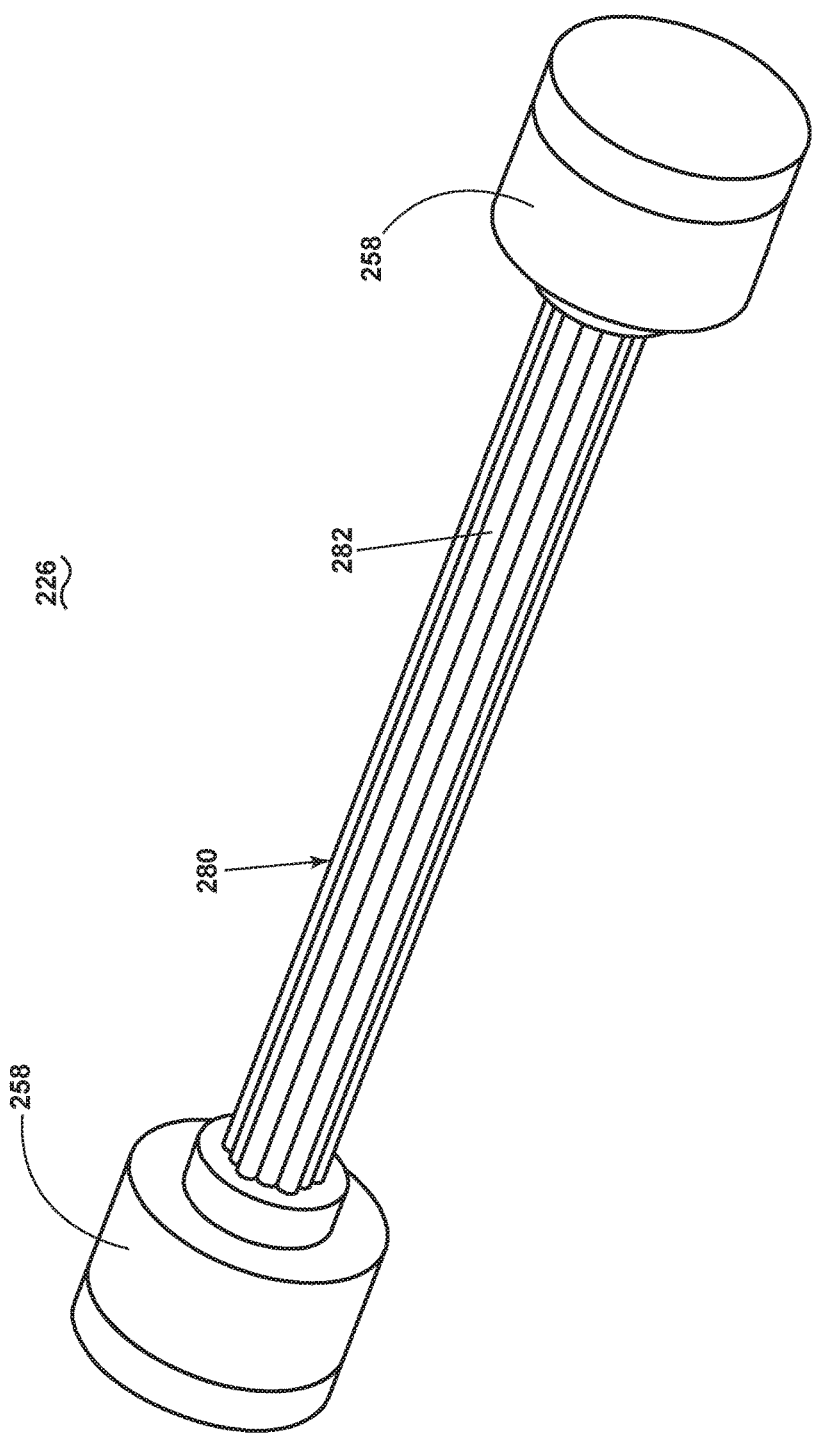
FIG. 8A is an enlarged view one rod assembly of FIG. 4 having linear rods, in accordance with various aspects described herein.

The rod assembly 126 as described herein can be individually adapted based upon anticipated axial and bending moment loads. FIG. 8A illustrates an enlarged view of another exemplary rod assembly 226. The rod assembly 226 of FIG. 8A can be substantially similar to the rod assembly 126 of FIGS. 4-8. As such, similar numerals will be used to describe similar elements, increased by a value of one hundred.

The rod assembly 226 can include a rod bundle 280, including a number of flexible alloy rods 282. In one example, the flexible alloy rods 282 can be linear, extending between opposing bushings 258 without any forces acting upon the rod assembly 226. The number of flexible alloy rods 282 of the rod bundle 280 can be adapted based upon, for example, anticipated loads. Additionally, the material utilized for the flexible alloy rods 282 can be changed based upon expected loads or operational temperatures. Such materials, for example, can include flexible alloys. In yet another example, the diameter of each individual flexible alloy rods 282 can be adapted based upon the anticipated loads. Similarly, other variables such as rod length, operational temperatures, of other factors can be determinative of changes or adaptations made to the rod assemblies 110 based upon the anticipated loading.

Figure 8B:
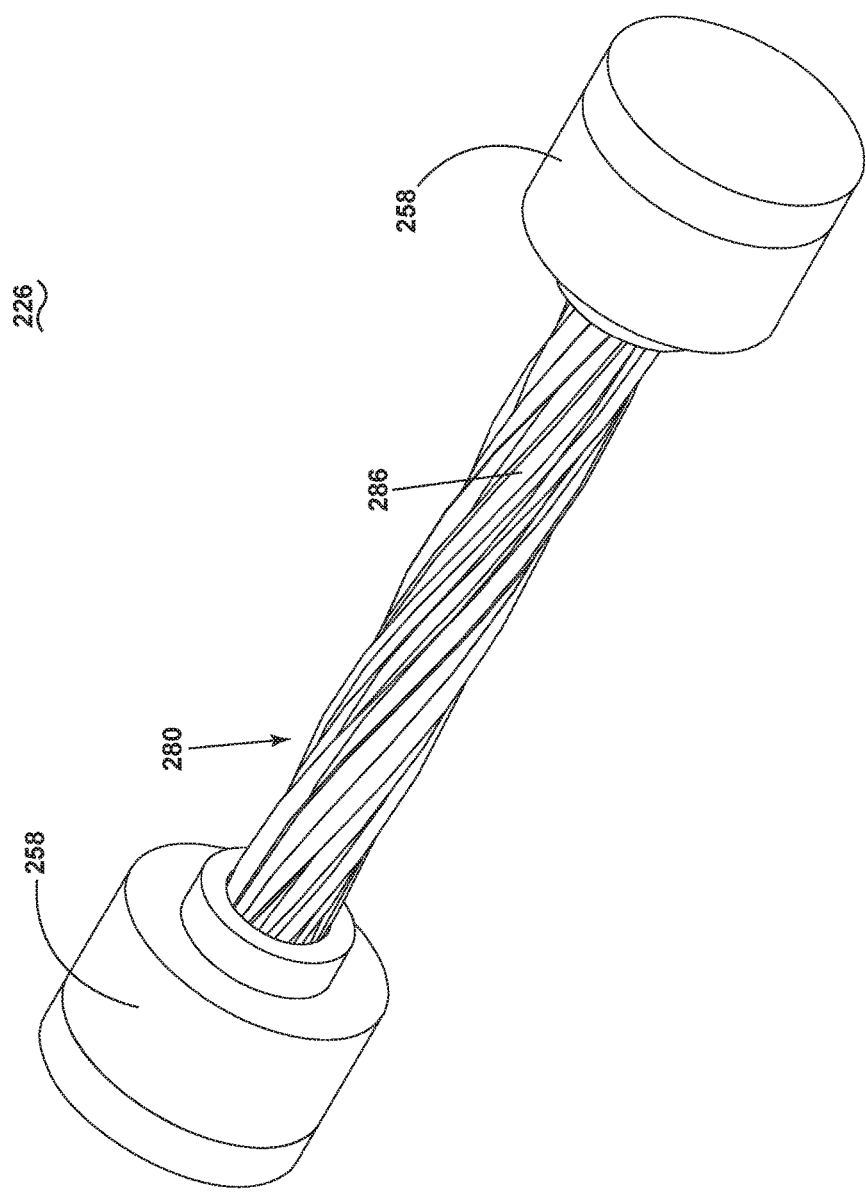
FIG. 8B is an enlarged view of an alternative rod assembly having a helical rods, in accordance with various aspects described herein.

FIG. 8B illustrates the rod assembly 226 having the rod bundle 280 organized as a number of helical flexible alloy rods 286 to form a group of wound rods or a helical wound cable, having a predetermined pitch. Such a pitch can be used to adapt the rod assembly 226 based upon anticipated axial loading or the magnitude of bending loads. Thus, the particular organization of the rods 282, 286, linear, helical, or otherwise, can be based upon the anticipated loading. For example, the helical flexible alloy rods 286 can provide for increased flexion, under lower anticipated loads, as opposed to the linear rods 282 of FIG. 8A, providing for lesser flexion under higher anticipated loads. As such, the geometry or organization of the individual rods 282, 286 can be adapted based upon the anticipated loads. In an additional example, the rod assembly 226 can have a combination of linear rods 282 and helical rods 286, such as a set of linear rods 282 surrounded by a layer of helically-wrapped rods 286.

Figure 9:
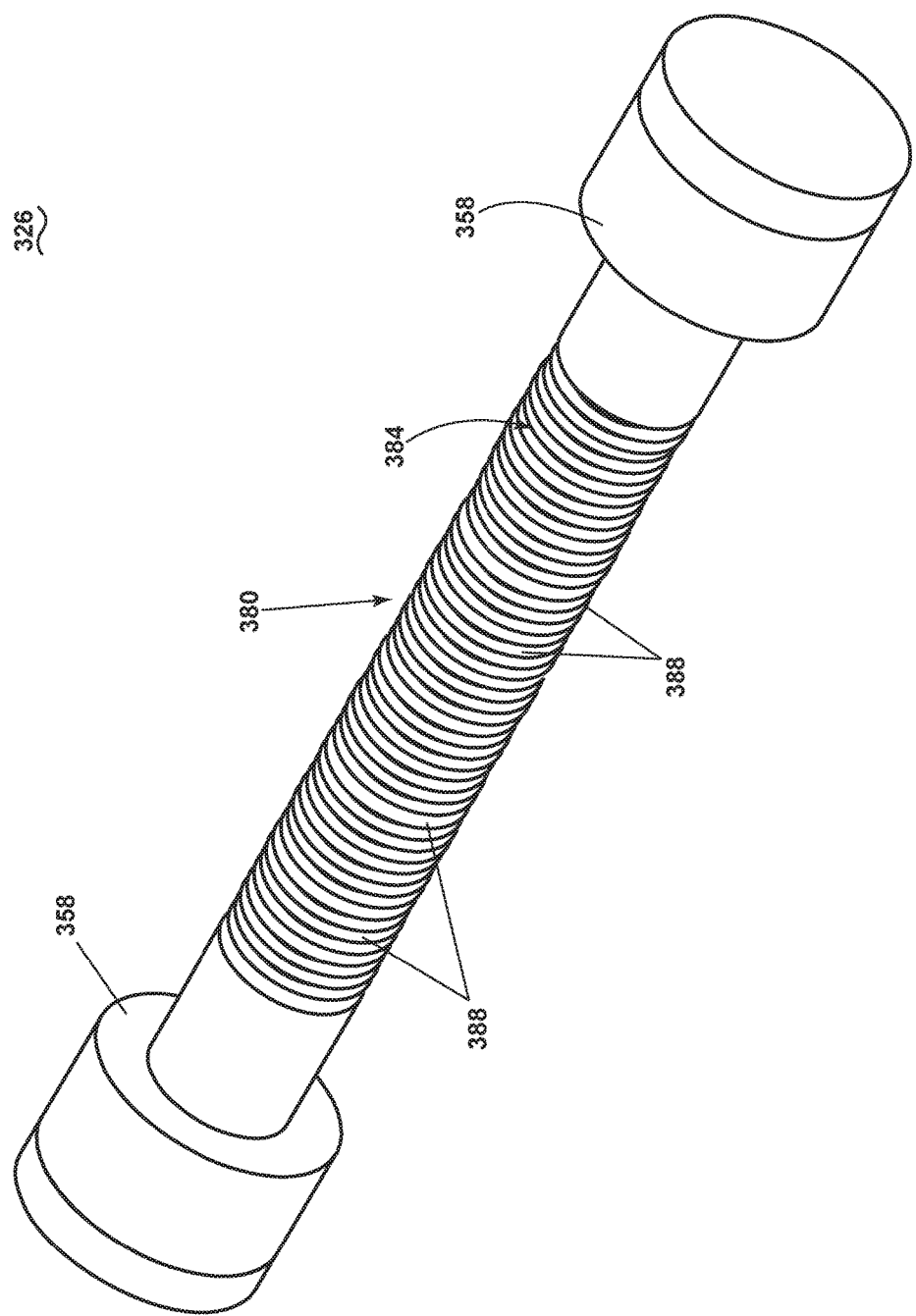
FIG. 9 is a perspective view of an alternative rod assembly for the flexible joint of FIG. 4, including a helical sheath, in accordance with various aspects described herein.

FIG. 9 illustrates another exemplary rod assembly 326. The rod assembly 326 of FIG. 9 can be substantially similar to the rod assembly 226 of FIGS. 9A-9B. As such, similar numerals will be used to describe similar elements increased by a value of one hundred.

A rod bundle 380 is arranged between two bushings 358. Regardless of whether the flexible alloy rods of the rod bundle 380 are straight (FIG. 8A) or helically wound (FIG. 8B), a protective sheath 384 can wrap around at least a portion of the rod assembly 326. In the illustrated example, the protective sheath 384 includes a helical, compliant sheath including a plurality of coils 388 provided around the rod bundle 380 between the bushings 358 to form a helical coil sleeve as the sheath 384. The sheath 232 can protect the rod bundle 380, while providing support for additional loading. For example, the sheath 384 can be coiled as a spring having a particular spring constant based upon the pitch and material of the plurality of coils 388. Such a sheath 384 can support axial loading along the longitudinal axis of the rod assembly 326 under compression or decompression. Additionally, the sheath 384 can support bending moment loading and kinematic motion in rotational degrees of freedom outside of axial. Furthermore, the plurality of coils 388 of the sheath 384 can be tailored based upon pitch to support anticipated load while remaining compliant with the preload of the bellows (FIG. 3). As such, the sheath 384 can be particularly tailored based upon the anticipated loading and kinematic motion at the rod assembly 326 and the entire joint assembly 86 (FIG. 3).

Figure 10:
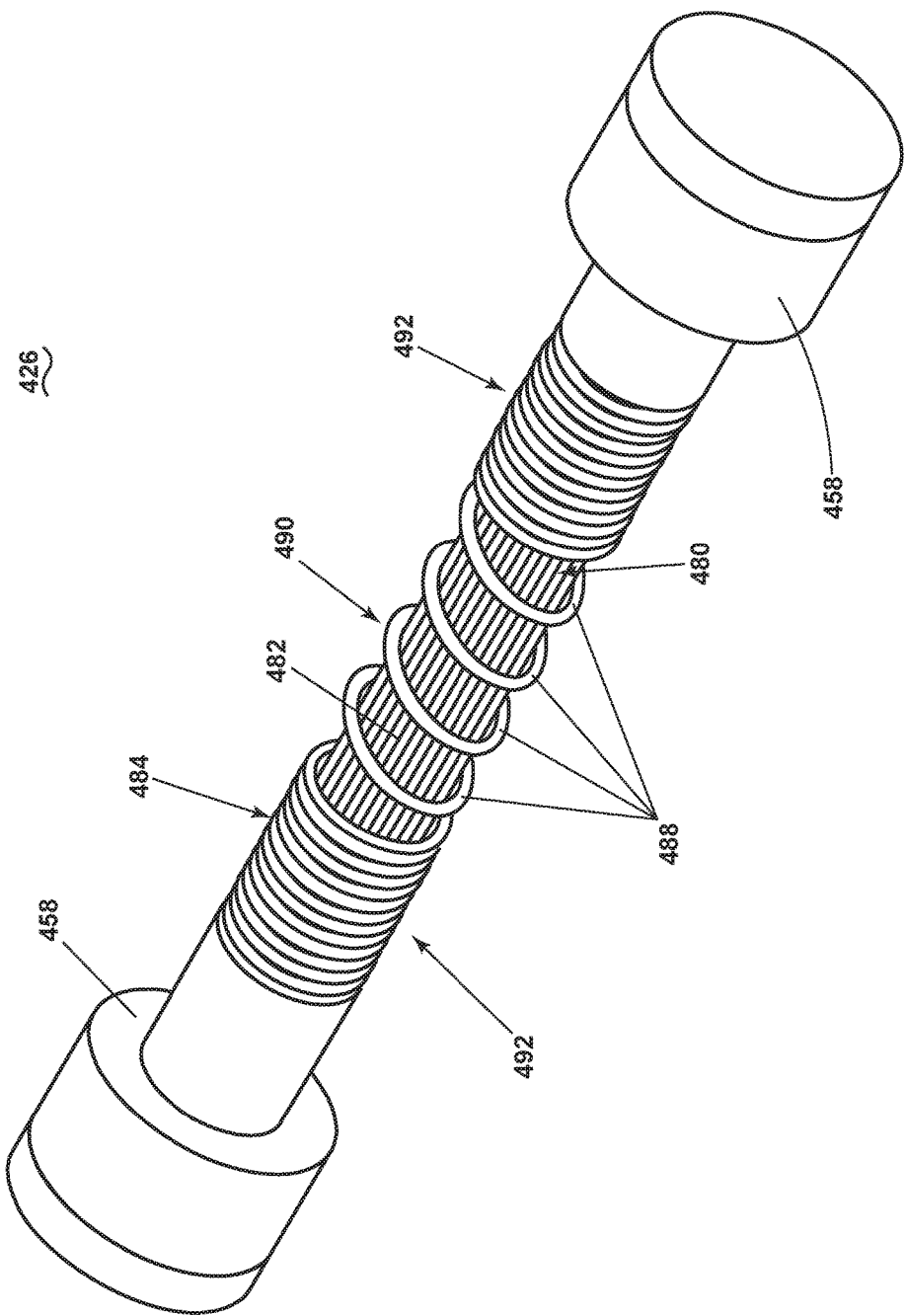
FIG. 10 is a perspective view of the rod of FIG. 9, including an alternative helical sheath, in accordance with various aspects described herein.

FIG. 10 illustrates yet another exemplary rod assembly 426. The rod assembly 426 of FIG. 10 can be substantially similar to the rod assembly 326 of FIG. 10. As such, similar numerals will be used to describe similar elements increased by a value of one hundred.

The rod assembly 426 can include a sheath 484 with a helical coil sleeve shown as coils 488 having a pitch such that the coils 488 are spaced 490 near the center of the rod assembly 426, exposing the rod bundle 480, and tightly arranged coils 492 near the bushings 458. The spaced portion 490 can be along any length of the sheath 484. As such, the sheath 484 can be discretely or locally tailored to support the loading and kinematic motion acting on the joint assembly 86 (FIG. 3). The spaced coils 490 near the center of the rod assembly 426 can be used to support a particular range of axial loading, while directing any bending moment loading and controlled motion to the center of the rod assembly 426. As such, the bending moment and shear force of the joint assembly 86 (FIG. 3) can be directed to an axial center of the rod assembly 426 as opposed to another position, which may be less suited to the bending moments or shear forces.

Figure 11:
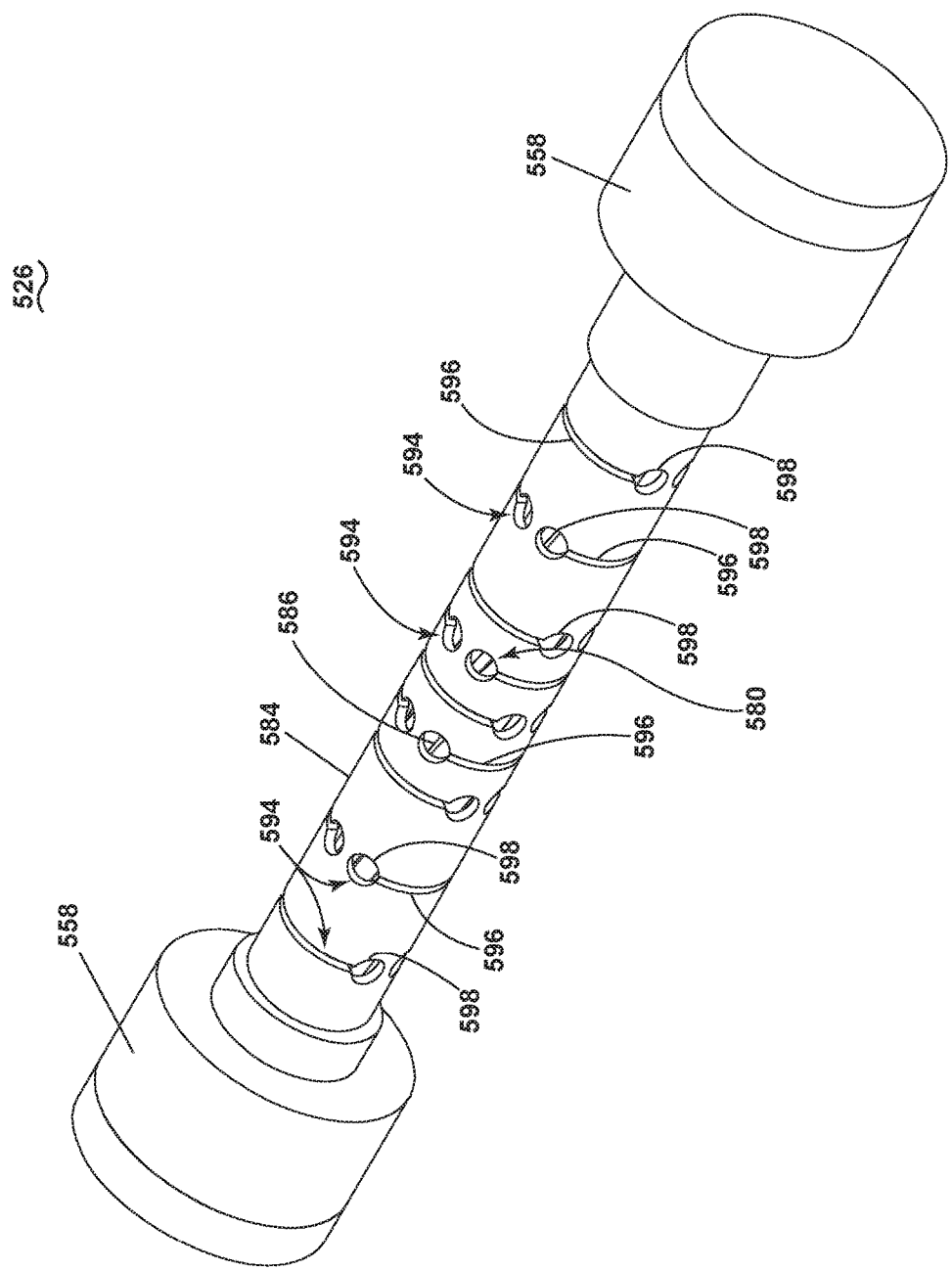
FIG. 11 is a perspective view of another alternative rod assembly for the flexible joint of FIG. 4 having a cylindrical sheath with a cutout pattern, in accordance with various aspects described herein.

Referring now to FIG. 11, another exemplary sheath 584 is illustrated on a rod assembly 526. The rod assembly 526 of FIG. 11 can be substantially similar to the rod assembly 426 of FIG. 10, except having helical flexible alloy rods 586 forming a rod bundle 580. As such, similar elements will be described with similar numerals increased by a value of one hundred.

The sheath 584 is generally cylindrical and extends between the bushings 558. A system of apertures 594 are provided through the sheath 584. In the illustrated example, the apertures include a linear slit 596 connecting two end openings 598. The apertures 594 are formed around the sheath 584, such that the two end openings 598 are positioned adjacent to one another, but slightly spaced from one another. The portion of the sheath 584 between the end openings 598 creates a rotational flexure. The rotational flexures are sized for a particular spring constant and magnitude of rotation. The linear slits 596 extend in the circumferential direction about a longitudinal axis defined through the rod assembly 526. The apertures 594 provide for flexion of the sheath 584 complementary to flexion of the rod bundle 580. A variable pitch of the slits 596 can also control the local stiffness of the sheath 584. Simply put, more apertures 594 provides for more bending compliance. With a greater population of apertures 594 at the longitudinal center of the sheath 584, the rod assembly 526 becomes more compliant at the center. Any bending is biased toward the center of the rod assembly 526.

Referring now to FIGS. 12A and 12B, two exemplary organizations of the apertures 594 of the sheath 584 of FIG. 11 are shown in a flattened position for comparison. Referring to FIG. 12A, the linear slits 596 are thin, with the end openings 598 being relatively small, by comparison. The apertures 594 are evenly spaced along the length of the sheath 584. The evenly spaced apertures 594 provide for an even bending moment along the length of the sheath 584, such as that of FIG. 9. Comparatively, looking at FIG. 12B, the linear slits 596 are thicker and the end openings 598 are larger by comparison. Additionally, the apertures 594 are unevenly spaced, having a greater amount of apertures 594 near the longitudinal center of the sheath 584. As such, the bending moment will be less near the center of the rod assembly 526, tailoring bending of the joint assembly 86 (FIG. 3) near the center of the rod bundles 580.

It should be appreciated, by the comparison of FIGS. 12A and 12B, that the particular apertures 594, including size of the linear slits 596 and end openings 598, can be tuned to a particular mode of bending. More specifically, the shape of bending of the rod bundle within the sheath 584 and the kinematic motion of the bending can be at least partially determined by the sheath 584. For example, the organization of apertures 436 in FIG. 12B will direct bending toward the center of the sheath 584. A larger linear slit 596 or end openings 598 can provide for increased movement of the rod assembly 526, while a smaller linear slit 596 and end openings 598 provide for greater surface area for the sheath 584, having a higher bending moment. Furthermore, providing a greater or lesser number of apertures 594, to a particular position on the sheath 584, can control the kinematic motion of the rod assembly 526 or the bending moment. Additional factors, such as sheath material, sheath length, and sheath thickness can be important in determining kinematic motion of the rod assembly 526 as well as tuning to particular loading on the joint assembly 86.

It should be further appreciated that while the apertures 594 are shown as having generally circular or arcuate openings 598 between linear slits 596, the apertures 436 should not be so limited. For example, the openings 598 can be circular, oval, elliptical, linear, curvilinear, square, rectangular, unique, or any combination thereof, in non-limiting examples. Furthermore, the slits 596, need not be linear, nor extend in the circumferential direction of the sheath 584 perpendicular to the longitudinal direction of the rod bundle 580. For examples, the slits can be linear, non-linear, curvilinear, or any combination thereof, as well as can have variable cross-sections, such as increasing or decreasing widths. The slits 596 can also extend, in non-limiting examples, in a helical fashion, perpendicular to the longitudinal direction of the rod bundle 580, or parallel to the longitudinal direction of the rod bundle 580, or any combination thereof. Thus, it should be appreciated that the geometry of the apertures 594, openings 598, and slits 596 can be adapted to for a plurality of unique sheaths 584. As such, the particular sheath 584 can be adapted to the particular desired kinematic motion of each individual rod bundle 580 (FIG. 11).

Figure 13:
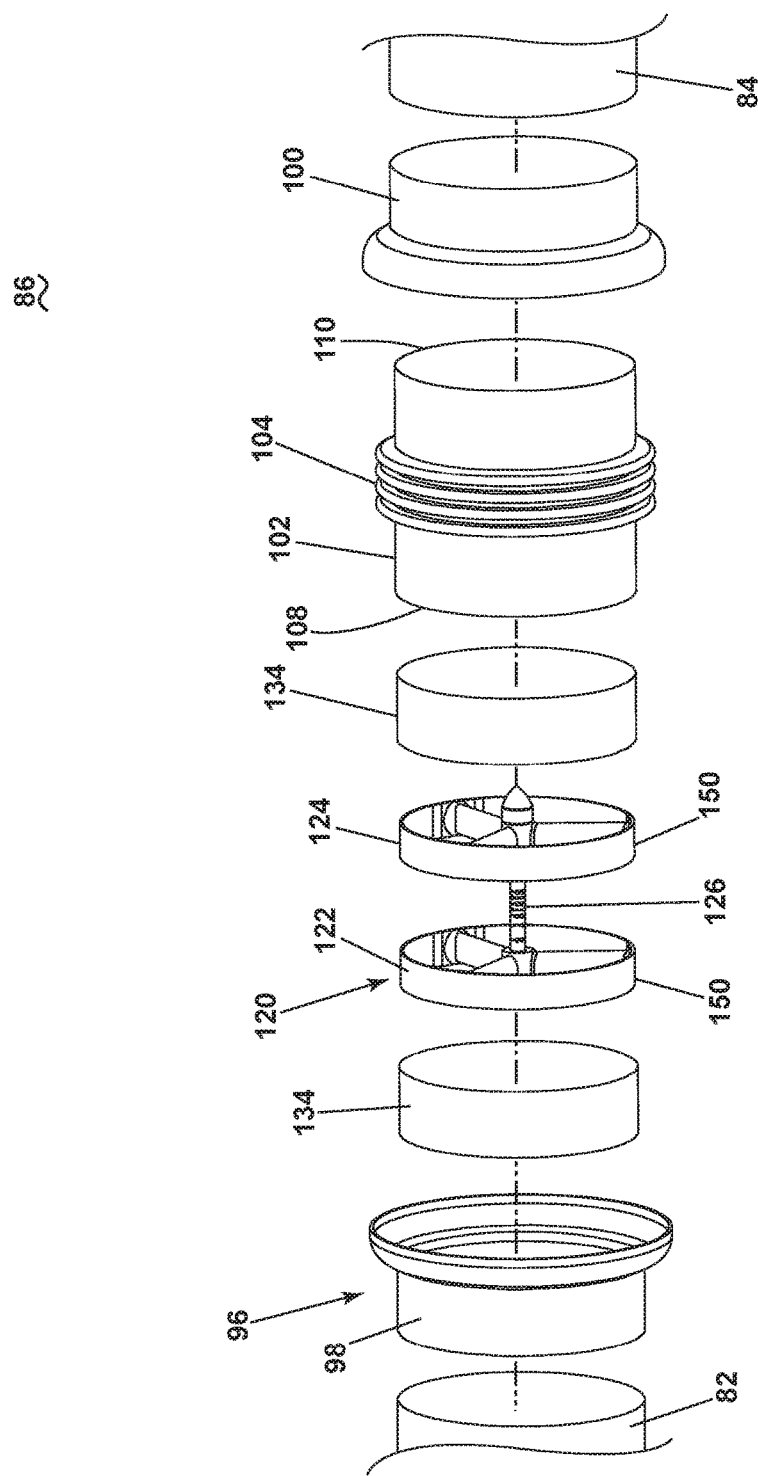
FIG. 13 is a perspective view of a support assembly for the flexible joint of FIG. 4 in accordance with various aspects described herein.

Referring now to FIG. 13, showing an exploded view of the joint assembly 86 as described herein. During assembly, the outer rings 150 can couple to the liners 134. The liners 134 can couple to the bellows 102. The first and second ends 108, 110 of the bellows 102 can mount to the first and second casings 96, 98. The ends of the bellows 108, 110 and casings 98, 100 can mount to the first and second ducts 82, 84 in any manner, such as with the aforementioned butt weld.

While FIG. 13 illustrates and describes interconnection of the ends 108, 110 of the bellows 102, the casings 98, 100, and the ducts 82, 84 in one organization, any organization for coupling the joint assembly 86 is contemplated. It should be understood that such an organization as described is non-limiting, such that either duct 82, 84 can mount to either end 108, 110 of the bellows 102, or the casings 98, 100, or any other elements that will be fastenable to the ducts 82, 84.

Any combination is contemplated, such that the first and second ducts 82, 84 couple to the joint assembly 86 and fluidly seal the joint assembly 86.

The high-pressure joint assemblies described herein have a low total mass, a simplified frictionless, and wear-free design, a flex joint utilizing multiple rods for reduced stresses and low bending moment that is tunable to high-pressure thrust loads.

Typical high-pressure joints consist of massive machined solid bar stock to form matched interfacing inner and outer shrouds. High-pressure thrust loads generate high frictional loads at the interface surfaces of such designs. These loads result in a high bending moment for the flex joint assembly. The flexible joint assembly 86 as described herein uniquely de-couples the high internal thrust pressure loads from the frictional interface reaction shear loads. The flexible joint assembly 86 does not include any frictional interface surfaces to transfer axial thrust loads and provides a rotational kinematic constraint based on the combined rod bundle bending motion. Axial loads are carried directly by the rod assemblies. The individual bundles of rods act as rotational bending flexures to allow three rotational degrees of freedom for small angular rotations, such as less than 8 degrees. Axial thrust and bending moment loads are distributed to the individual flexible alloy rods. This results in a lightweight, compact, simplified zero-backlash design supporting spherical kinematic motion without interfacial wear, friction, and associated high rotational stiffness.

The frictionless wear-free tunable flexural rod bundles carry the axial thrust and rotational bending loads. For small angular rotations, the individual bundled flexible alloy rods generate a significantly lower bending moment reaction and stress than a single flexural rod with equivalent cross-sectional area. A solid rod of equivalent length will generate significantly higher stresses and reaction moments. For the same geometric magnitude of angular rotation, the maximum bending stress and reaction moment are reduced with the use of multiple small diameter rods.

The axial load capacity of the rod assemblies is tunable and adjustable by changing the number of flexible alloy rods in a rod assembly or the number of rod assemblies. Depending on the internal pressure magnitude, the number of rod assemblies is changed by adjusting the inner diameter of a universal bushing.

Each rod bundle consists of individual high-temperature spring-tempered nickel (or other) alloy rods that are bundled and attached at the ends with two machined bushings. A helical coil protective wrap or sheath is used to protect and constrain the rod bundles. Joining of the rod bundles to the bushings can be by welding, brazing, or other equivalent metal joining method. The bushings are then aligned and welded to the mounting tab slots of the two aligned supports. To create a slight pre-load for the flex joint assembly the bellows are slightly compressed during assembly and the length L of the rod bundle length between end bushings, is sized to the desired pre-load length.

Stresses from the normal and bending loads can be calculated from closed-form beam equations and superimposed to determine the approximate maximum total tensile stress. The number and diameter of the rod assemblies can be varied to size and optimize the tensile stress for a specific internal pressure. The total tensile stress curve is used to determine the optimal rod assembly diameter. In one example, a rod diameter between 0.022" and 0.027" was selected, while any rod diameter is contemplated.

The joint assembly includes a low total mass, a simplified frictionless and wear-free spherical flexure design, a low bending moment, multiple rods for reduced stresses and moment, and tunable high-pressure thrust load adjustability and capability. The design can be tuned and optimized for strength, kinematic motion, and minimal total mass. The overall kinematic motion of the flexible joint can be controlled by adjusting the helical pitch of the rod bundle the overall length L of the rod bundles and the design parameters of the outer variable pitch helical spring of the rod bundles or the exterior sheath.

Additive manufacturing such as 3D printing can be used to manufacture the particular elements having the discrete variable pitches necessary to meet design parameters. Additive direct metal laser melting (DMLM) kinematic link is another option for controlling the desired overall kinematic motion of the flexible joint.

The above disclosure provides a variety of benefits including that a pre-loaded, flexible joint having three degrees or rotational freedom can be provided and can have reduced reaction loading during assembly, operation, and thermal growth of high-temperature bleed-air ducting systems.

To the extent not already described, the different features and structures of the various embodiments can be used in combination as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A duct assembly comprising:
   a first duct;
   a second duct; and
   a flexible joint assembly coupling the first duct to the second duct and comprising:
   a bellows defining an interior and having a first end and a second end and where the first end and second end are operably coupled with the first duct and the second duct, respectively;
   a support assembly located within the interior defined by the bellows and having a first support located within the first end and a second support, spaced from the first support, located within the second end; and
   a set of rod assemblies located within the interior and operably coupled to the first support and the second support and spanning a length there between and where the set of rod assemblies are configured to act as rotational flexures at the flexible joint assembly.

2. The duct assembly of claim 1, wherein a rod in the set of rod assemblies comprises a rod bundle and two bushings that attach at each end of the rod bundle.

3. The duct assembly of claim 2, wherein the rod bundle comprises a set of flexible alloy rods and allows three rotational degrees of freedom about the rod bundle.

4. The duct assembly of claim 2, wherein the rod bundle comprises a set of wound rods having a predetermined helical pitch that form a helical wound cable.

5. The duct assembly of claim 2, further comprising a protective sheath that wraps at least a portion of an exterior of the rod bundle.

6. The duct assembly of claim 5, wherein the protective sheath includes a helical coil sheath.

7. The duct assembly of claim 6, wherein the helical coil sheath includes a variable pitch along at least a portion of its length.

8. The duct assembly of claim 1, wherein the first support and second support are located on either side of convolutions in the bellows.

9. The duct assembly of claim 8, wherein a length of a rod assembly of the set of rod assemblies is sized to correspond to the convolutions being in a compressed state such that the bellows are pre-loaded.

10. The duct assembly of claim 1, further comprising a set of protective shrouds surrounding at least a portion of the bellows.

11. The duct assembly of claim 10 wherein the bellows is multi-layer, including liner facing the interior of the joint assembly.

12. The duct assembly of claim 1 wherein the first support and second support include a ring with spokes extending radially interiorly therefrom and wherein the spokes join at a central section.

13. The duct assembly of claim 12 wherein the set of rod assemblies are operably coupled to the central section of the first support and the second support.

* * * * *